(12) United States Patent
Bellegarda et al.

(10) Patent No.: US 9,218,809 B2
(45) Date of Patent: *Dec. 22, 2015

(54) FAST, LANGUAGE-INDEPENDENT METHOD FOR USER AUTHENTICATION BY VOICE

(71) Applicant: Apple Inc., Cupertino, CA (US)

(72) Inventors: Jerome R. Bellegarda, Saratoga, CA (US); Kim E. A. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,605

(22) Filed: Jan. 9, 2014

(65) Prior Publication Data

US 2014/0195237 A1     Jul. 10, 2014

Related U.S. Application Data

(63) Continuation of application No. 11/811,955, filed on Jun. 11, 2007, now Pat. No. 8,645,137, which is a continuation of application No. 09/527,498, filed on Mar. 16, 2000, now abandoned.

(51) Int. Cl.
*G10L 15/07*     (2013.01)
*G10L 17/04*     (2013.01)

(52) U.S. Cl.
CPC ............ *G10L 15/07* (2013.01); *G10L 17/04* (2013.01)

(58) Field of Classification Search
CPC .......... G10L 17/04; G10L 17/00; G10L 15/07
USPC ....................................... 704/250, 270, 273
See application file for complete search history.

(56) References Cited

U.S. PATENT DOCUMENTS 5,828,999 A * 10/1998 Bellegarda et al. ........... 704/240
6,141,644 A * 10/2000 Kuhn et al. .................... 704/273
6,490,560 B1 * 12/2002 Ramaswamy et al. ........ 704/250
6,493,667 B1 * 12/2002 de Souza et al. .............. 704/240
8,645,137 B2 * 2/2014 Bellegarda et al. ........... 704/250

* cited by examiner

*Primary Examiner* — Angela A Armstrong
(74) *Attorney, Agent, or Firm* — Morrison & Foerster LLP

(57) ABSTRACT

A method and system for training a user authentication by voice signal are described. In one embodiment, a set of feature vectors are decomposed into speaker-specific recognition units. The speaker-specific recognition units are used to compute distribution values to train the voice signal. In addition, spectral feature vectors are decomposed into speaker-specific characteristic units which are compared to the speaker-specific distribution values. If the speaker-specific characteristic units are within a threshold limit of the speaker-specific distribution values, the speech signal is authenticated.

25 Claims, 7 Drawing Sheets

FAST, LANGUAGE-INDEPENDENT METHOD FOR USER AUTHENTICATION BY VOICE

RELATED APPLICATIONS

This application is a continuation of U.S. patent application Ser. No. 11/811,955, filed Jun. 11, 2007, which is a continuation of U.S. patent application Ser. No. 09/527,498, filed Mar. 16, 2000.

FIELD OF THE INVENTION

The present invention relates to speech or voice recognition systems and more particularly to user authentication by speech or voice recognition.

BACKGROUND OF THE INVENTION

The field of user authentication has received increasing attention over the past decade. To enable around-the-clock availability of more and more personal services, many sophisticated transactions have been automated, and remote database access has become pervasive. This, in turn, heightened the need to automatically and reliably establish a user's identity. In addition to standard password-type information, it is now possible to include, in some advanced authentication systems, a variety of biometric data, such as voice characteristics, retina patterns, and fingerprints.

In the context of voice processing, two areas of focus can be distinguished. Speaker identification is the process of determining which registered speaker provides a given utterance. Speaker verification, on the other hand, is the process of accepting or rejecting the identity of a speaker based upon an utterance. Collectively, they refer to the automatic recognition of a speaker (i.e., speaker authentication) on the basis of individual information present in the speech wave form. Most applications in which a voice sample is used as a key to confirm the identity of a speaker are classified as speaker verification. Many of the underlying algorithms, however, can be applied to both speaker identification and verification.

Speaker authentication methods may be divided into text-dependent and text-independent methods. Text-dependent methods require the speaker to say key phrases having the same text for both training and recognition trials, whereas text-independent methods do not rely on a specific text to be spoken. Text-dependent systems offer the possibility of verifying the spoken key phrase (assuming it is kept secret) in addition to the speaker identity, thus resulting in an additional layer of security. This is referred to as the dual verification of speaker and verbal content, which is predicated on the user maintaining the confidentiality of his or her pass-phrase.

On the other hand, text-independent systems offer the possibility of prompting each speaker with a new key phrase every time the system is used. This provides essentially the same level of security as a secret pass-phrase without burdening the user with the responsibility to safeguarding and remembering the pass-phrase. This is because prospective impostors cannot know in advance what random sentence will be requested and therefore cannot (easily) play back some illegally pre-recorded voice samples from a legitimate user. However, implicit verbal content verification must still be performed to be able to reject such potential impostors. Thus, in both cases, the additional layer of security may be traced to the use of dual verification.

In all of the above, the technology of choice to exploit the acoustic information is hidden Markov modeling (HMM) using phonemes as the basic acoustic units. Speaker verification relies on speaker-specific phoneme models while verbal content verification normally employs speaker-independent phoneme models. These models are represented by Gaussian mixture continuous HMMs, or tied-mixture HMMs, depending on the training data. Speaker-specific models are typically constructed by adapting speaker-independent phoneme models to each speaker's voice. During the verification stage, the system concatenates the phoneme models appropriately, according to the expected sentence (or broad phonetic categories, in the non-prompted text-independent case). The likelihood of the input speech matching the reference model is then calculated and used for the authentication decision. If the likelihood is high enough, the speaker/verbal content is accepted as claimed.

The crux of speaker authentication is the comparison between features of the input utterance and some stored templates, so it is important to select appropriate features for the authentication. Speaker identity is correlated with the physiological and behavioral characteristics of the speaker. These characteristics exist both in the spectral envelope (vocal tract characteristics) and in the supra-segmental features (voice source characteristics and dynamic features spanning several segments). As a result, the input utterance is typically represented by a sequence of short-term spectral measurements and their regression coefficients (i.e., the derivatives of the time function of these spectral measurements).

Since HMMs can efficiently model statistical variation in such spectral features, they have achieved significantly better performance than less sophisticated template-matching techniques, such as dynamic time-warping. However, HMMs require the a priori selection of a suitable acoustic unit, such as the phoneme. This selection entails the need to adjust the authentication implementation from one language to another, just as speech recognition systems must be re-implemented when moving from one language to another. In addition, depending on the number of context-dependent phonemes and other modeling parameters, the HMM framework can become computationally intensive.

SUMMARY OF THE INVENTION

A method and system for training a user authentication by voice signal are described. In one embodiment, a set of feature vectors are decomposed into speaker-specific recognition units. The speaker-specific recognition units are used to compute distribution values to train the voice signal. In addition, spectral feature vectors are decomposed into speaker-specific characteristic units which are compared to the speaker-specific distribution values. If the speaker-specific characteristic units are within a threshold limit of the speaker-specific distribution values, the speech signal is authenticated.

BRIEF DESCRIPTION OF THE DRAWINGS

Features and advantages of the present invention will be apparent to one skilled in the art in light of the following detailed description in which.

DETAILED DESCRIPTION

A method and system for training a user authentication by voice signal are described. In one embodiment, a set of feature vectors are decomposed into speaker-specific recognition units. The speaker-specific recognition units are used to compute distribution values to train the voice signal. In addition, spectral feature vectors are decomposed into speaker-specific characteristic units which are compared to the speaker-specific distribution values. If the speaker-specific characteristic units are within a threshold limit of the speaker-specific distribution values, the speech signal is authenticated.

In one embodiment, an entire utterance is mapped into a single point in some low-dimensional space. The speaker identification/verification problem then becomes a matter of computing distances in that space. As time warping is no longer required, there is no longer a need for the HMM framework for the alignment of two sequences of feature vectors, nor any dependence on a particular phoneme set. As a result, the method is both fast and language-independent In one embodiment, verbal content verification may also be handled, although here time warping is unavoidable. Because of the lower dimensionality of the space, however, standard template-matching techniques yield sufficiently good results. Again, this obviates the need for a phoneme set, which means verbal content verification may also be done on a language-independent basis.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
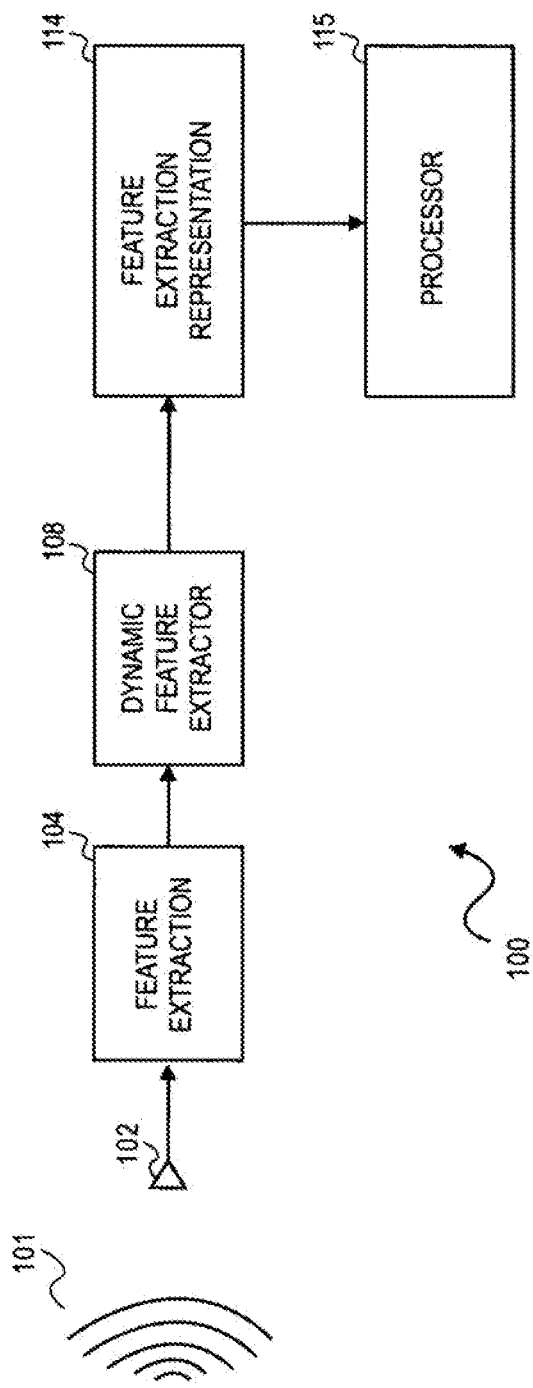
FIG. 1 is a block diagram of one embodiment of a user authentication system.

FIG. 1 is a block diagram of one embodiment of a user authentication system 100. Referring to FIG. 1, input device 102 receives a voice input 101 and converts voice input 101 into an electrical signal representative of the voice input 101. Feature extractor 104 receives the electrical signal and samples the signal at a particular frequency, the sampling frequency determined using techniques known in the art. In one embodiment, feature extractor 104 extracts the signal every 10 milliseconds. In addition, feature extractor 104 may use a Fast Fourier Transform (FFT) followed by Filter Bank Analysis on the input signal in order to provide a smooth spectral envelope of the input 101. This provides a stable representation from one repetition to another of a particular speaker's utterances. Feature extraction 104 passes the transformed signal to dynamic feature extractor 108. Dynamic feature extractor 108 extracts the first and second order regression coefficients for every frame of data. The first and second order regression coefficients are concatenated and passed from dynamic feature extractor 108 as feature extraction representation 114. In one embodiment, the feature extraction representation 114 is an M×N matrix which is a sequence of M feature vectors or frames of dimension N. In one embodiment, M is M is on the order of a few hundred and N is typically less than 100 for a typical utterance of a few seconds in length. After feature extraction representation 114 is created, the feature representation is decomposed into speaker-specific recognition units by processor 115 and speaker-specific recognition distribution values are computed from the recognition units.

User authentication system 100 may be hosted on a processor but is not so limited. In alternate embodiments, dynamic feature extractor 108 may comprise a combination of hardware and software that is hosted on a processor different from authentication feature extractor 104 and processor 115.

Figure 2:
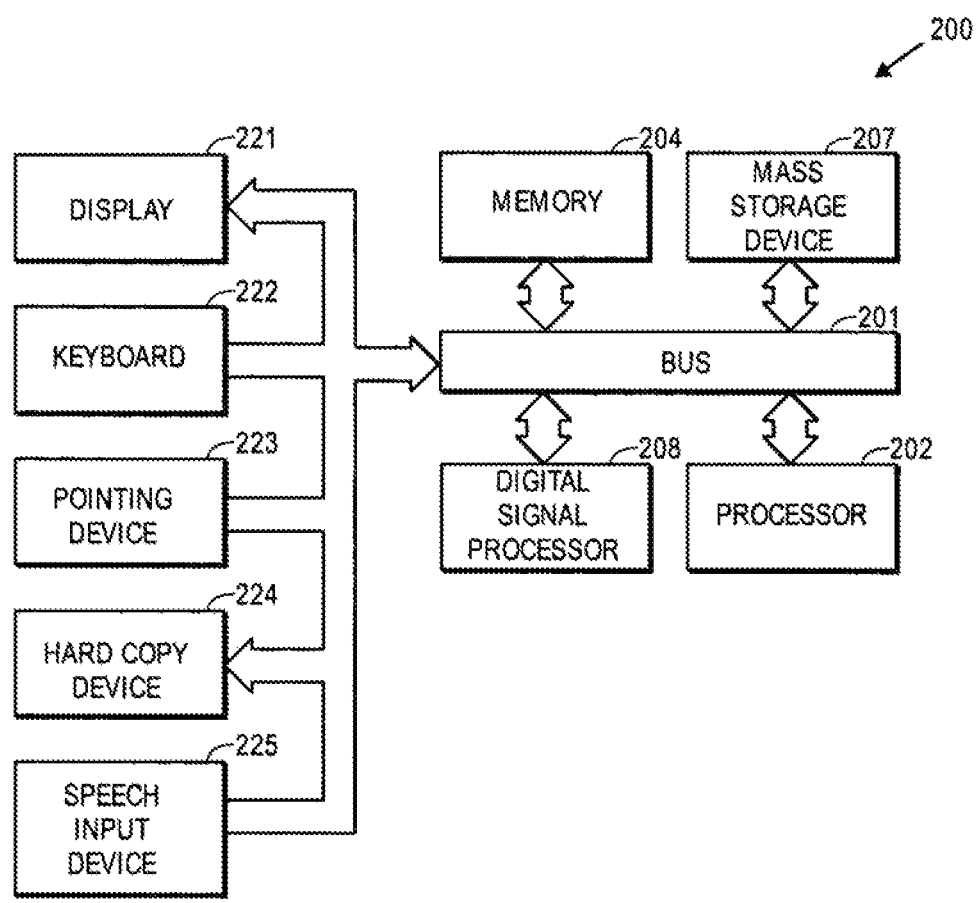
FIG. 2 is a block diagram of one embodiment for a computer system architecture of a user authentication system.

FIG. 2 is a block diagram of one embodiment for a computer system architecture 200 that may be used for user authentication system 100. Referring to FIG. 2, computer system 200 includes system bus 201 used for communication among the various components of computer system 200. Computer system 200 also includes processor 202, digital signal processor 208, memory 204, and mass storage device 207. System bus 201 is also coupled to receive inputs from keyboard 222, pointing device 223, and speech signal input device 225. In addition, system bus 201 provides outputs to display device 221 and hard copy device 224.

Figure 3:
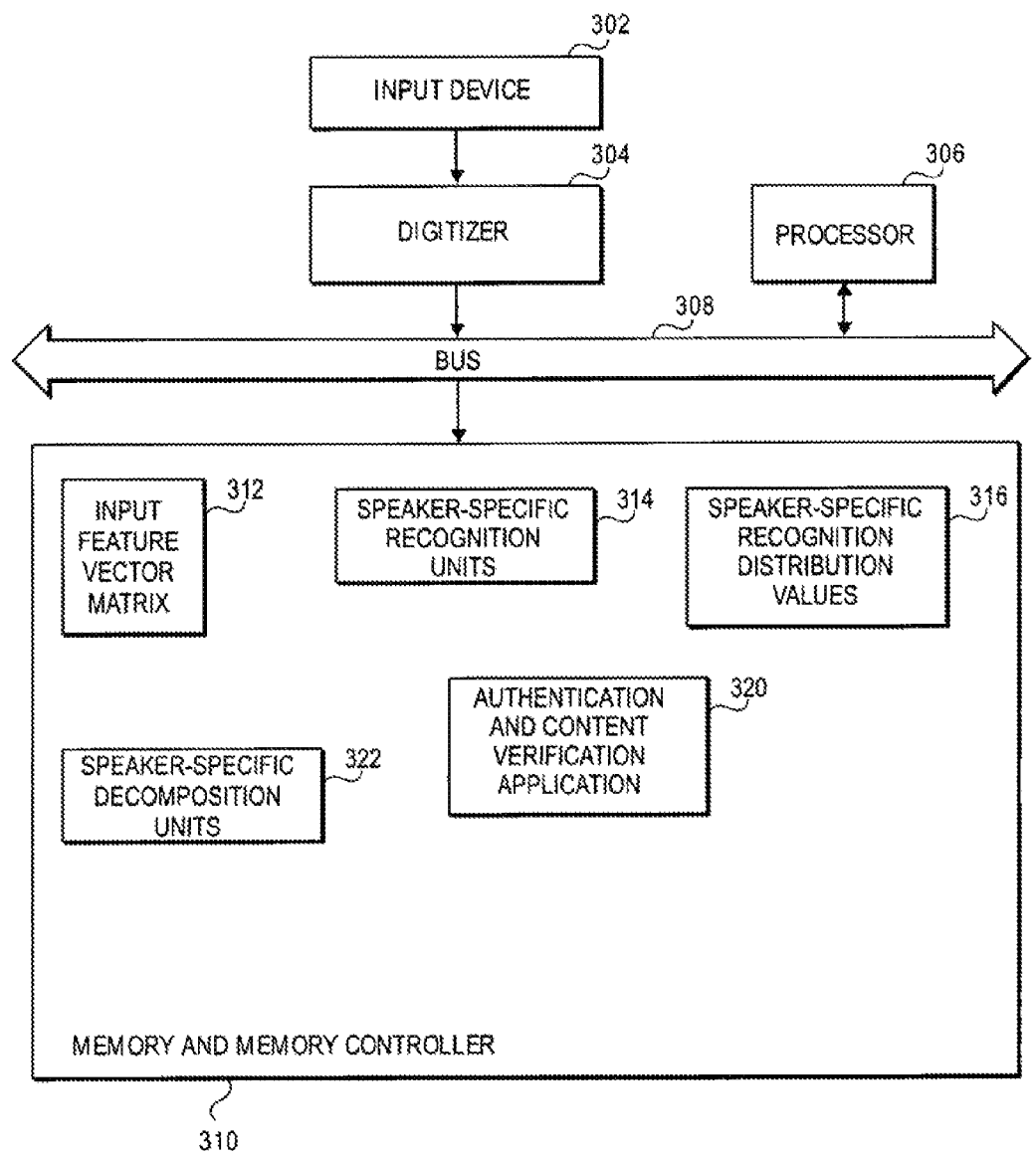
FIG. 3 is a block diagram of one embodiment for a computer system memory of FIG. 2.

FIG. 3 is a block diagram of one embodiment for a computer system memory 310 of a user authentication system 100. Referring to FIG. 3, input device 302 provides speech signals to a digitizer 304. Digitizer 304, or feature extractor, samples and digitize the speech signals for further processing. Digitizer 304 may include storage of the digitized speech signals in the speech input data memory component of memory 310 via system bus 308. Digitized speech signals are processed by digital processor 306 using authentication and content verification application 320.

In one embodiment, digitizer 304 extracts spectral feature vectors every 10 milliseconds. In addition, a short term Fast Fourier Transform followed by a Filter Bank Analysis is used to ensure a smooth spectral envelope of the input spectral features. The first and second order regression coefficients of the spectral features are extracted. The first and second order regression coefficients, typically referred to as delta and delta-delta parameters, are concatenated to create input feature vector matrix 312. Input feature vector matrix 312 is an M×N matrix of frames (F). Within matrix 312, each row represents the spectral information for a frame and each column represents a particular spectral band over time. In one embodiment, the spectral information for all frames and all bands may include approximately 20,000 parameters. In one embodiment, a single value decomposition (SVD) of the matrix F is computed. The computation is as follows:

$$F \approx F' = USV^T$$

where U is the M×R matrix of left singular vectors, $u_m (1 \leq m \leq M)$, S is the (R×R) diagonal matrix of singular values $s_R (1 \leq r \leq R)$, V is the (N×R) matrix of right singular vectors $v_n (1 \leq n \leq N)$, R<<M, N is the order of the decomposition, and $^T$ denotes matrix transposition. A portion of the SVD of the matrix F (in one embodiment, the S or V portion) is stored in speaker-specific decomposition units 322.

During training sessions, multiple speaker-specific decomposition units 322 are created and speaker-specific recognition units 314 are generated from the decomposition units 322. Each speaker to be registered (1≤j≤J) provides a small number K, of training sentences. In one embodiment, K=4 and J=40. For each speaker, each sentence or utterance is then mapped into the SVD matrices and the R×R matrix is generated into a vector s for each input sentence k. This results in a set of vectors $s_{j,k}$ (1≤j≤J, 1≤k≤K), one for each training sentence of each speaker. In one embodiment, speaker-specific recognition distribution values 316 are computed for each speaker.

Memory 310 also includes authentication and content verification application 320 which compares speaker-specific recognition units 314 with the speaker specific recognition distribution values 316. If the difference between the speaker-specific recognition units 314 and the distribution values 316 is within an acceptable threshold or range, the authentication is accepted. This distance can be computed using any distance measure, such as Euclidean, Gaussian, or any other appropriate method. Otherwise, the authentication is rejected and the user may be requested to re-input the authentication sentence.

Figure 4:
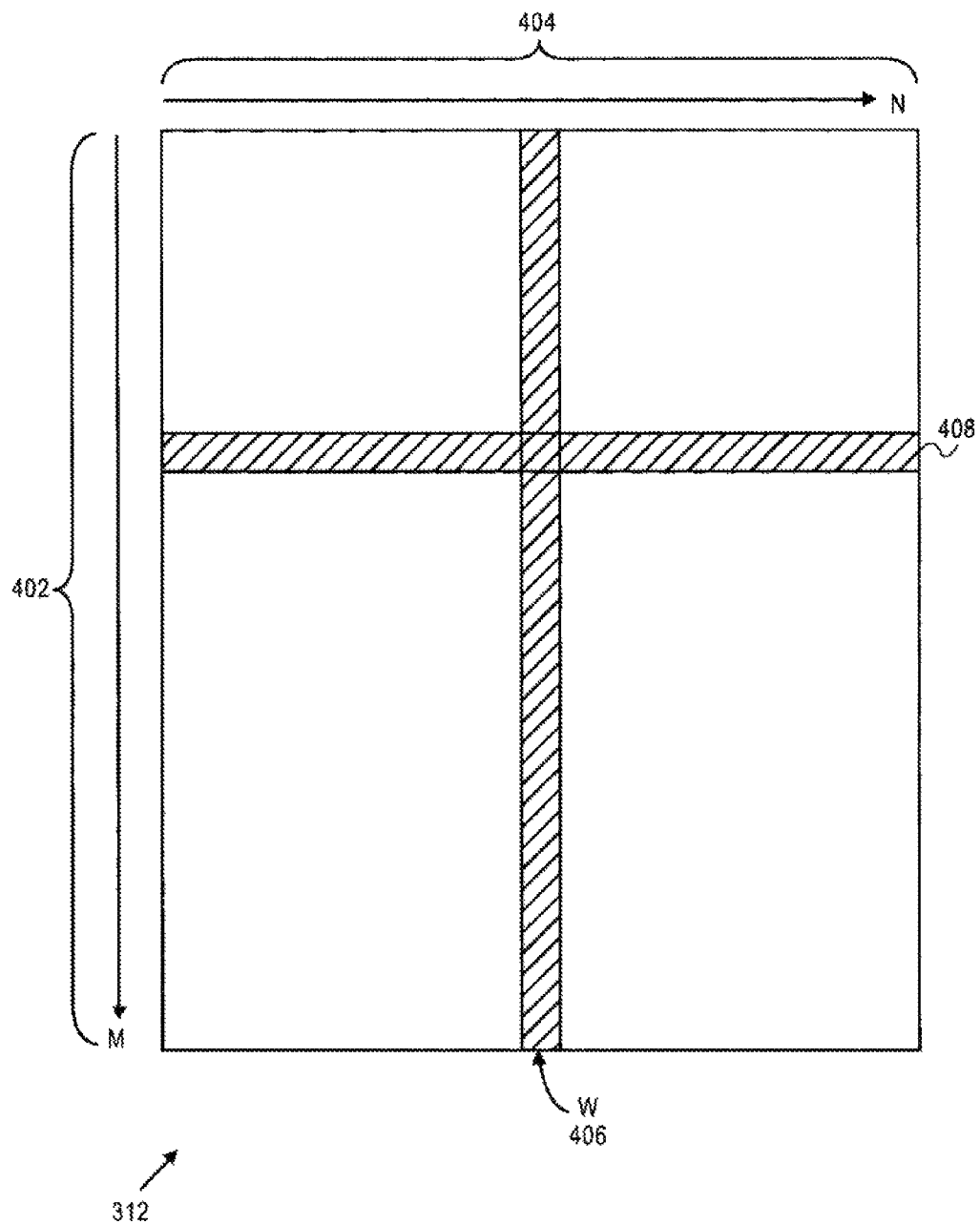
FIG. 4 is a block diagram of one embodiment for an input feature vector matrix of FIG. 3.

FIG. 4 is a block diagram of one embodiment for an input feature vector matrix 312. Input feature vector matrix 312 is a matrix of M feature vectors 420 of dimension N 404. In one embodiment, M is on the order of a few hundred and N is typically less than 100 for an utterance of a few seconds in length. Each utterance is represented by an individual M×N matrix 312 of frames F. Row 408 represents the spectral information for a frame and column 406 represents a particular spectral band over time. In one embodiment, the utterance may be extracted to produce approximately 20,000 parameters (M×N).

Figure 5:
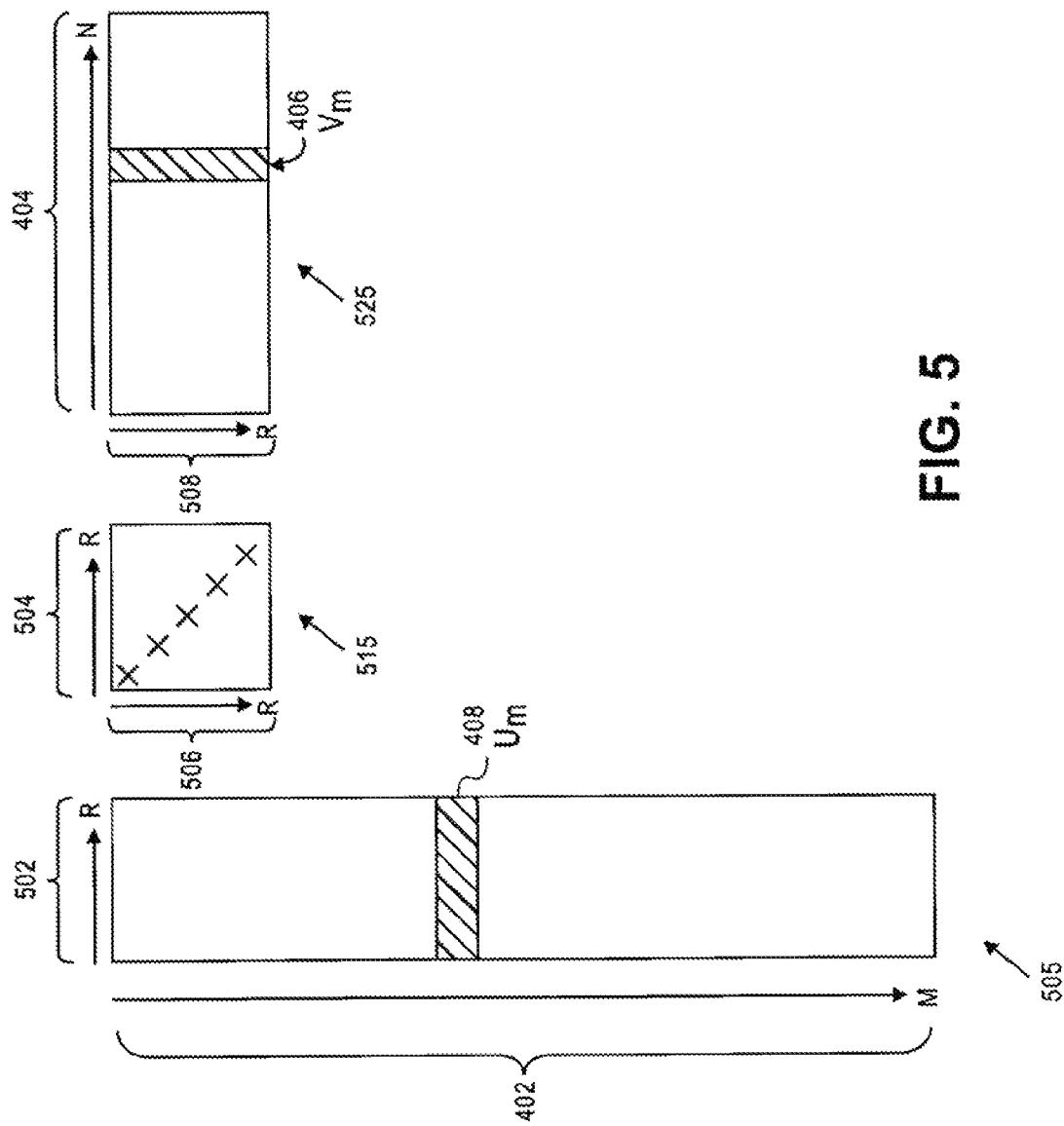
FIG. 5 is a block diagram of one embodiment for speaker-specific decomposition vectors of FIG. 3.

FIG. 5 is a block diagram of one embodiment for a speaker specific decomposition units 322. In one embodiment, singular value decomposition (SVD) of the matrix F is performed. The decomposition is as follows:

$$F \approx F' = USV^T$$

where U 505 is the M×R matrix of left singular vectors, $u_m$ (1≤m≤M), S 515 is the (R×R) diagonal matrix of singular values $s_r$ (1≤r≤R), and V 525 is the (N×R) matrix of right singular vectors $v_n$ (1≤n≤N), in which R≪M, N is the order of the decomposition, and $^T$ denotes matrix transposition. The singular value decomposition SVD of the matrix F is stored in speaker specific decomposition units 322.

The nth left singular vector $u_m$ 408 may be viewed as an alternative representation of the nth frame (that is, the nth eigenvector of the M×M matrix $FF^T$). The nth right singular vector $v_n$ 406 is an alternate representation of the nth spectral band (that is, the nth eigenvector of the N×N matrix 525 $F^TF$). The U matrix 505 comprises eigen-information related to the frame sequence across spectral bands, while the V matrix 525 comprises eigen-information related to the spectral band sequence across time. The S matrix 515 embodies the correlation between the given frame sequence and the given spectral band sequence which includes factors not directly related to the way frames are sequentially generated or spectral bands are sequentially derived. That is, the singular values $s_r$ should contain information that does not depend on the particular utterance text or spectral processing considered such as, for example, speaker-specific characteristics. The S matrix 515 is a diagonal matrix in which each entry in the diagonal of the matrix may be represented by $s_r$. The S matrix 515 may be represented by a vector s containing the R values $s_r$. With this notation, s encapsulates information related to the speaker characteristics.

The SVD defines the mapping between the original utterance and a single vector s of dimension R containing speaker-specific information. Thus, s may be defined as the speaker-specific representation of the utterance in a low dimensional space. Comparing two utterances may be used to establish the speaker's identity by computing a suitable distance between two points in the space. In one embodiment, the Gaussian distance is used to account for the different scalings along different coordinates of the decomposition. In one embodiment, a five dimensional space is utilized to compute the distance.

Figure 6:
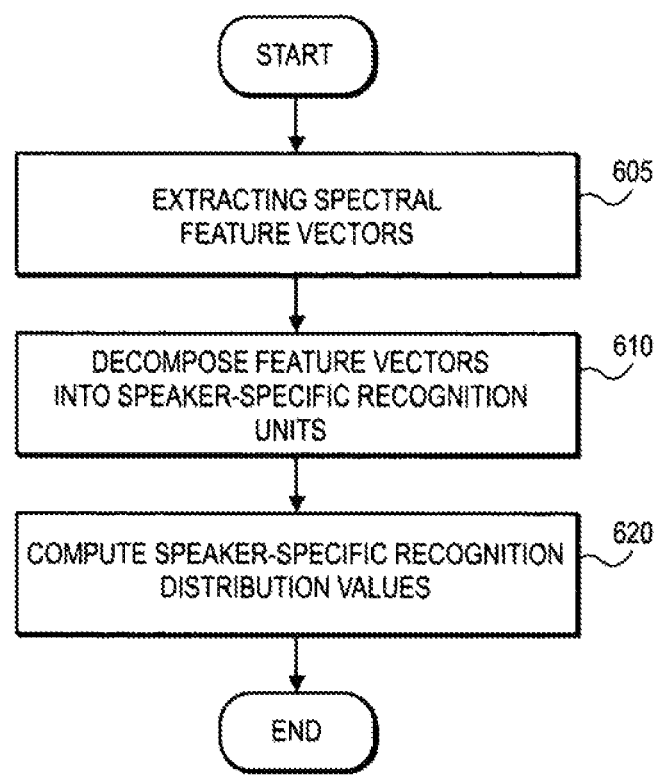
FIG. 6 is a flow diagram of one embodiment for user authentication by voice training.

FIG. 6 is a flow diagram of one embodiment for a user authentication by voice training. Initially at processing block 605, the spectral feature vectors for a user are extracted. During training, each speaker to be registered provides a small number of training sentences. In one embodiment, the user provides K=4 sentences. Each sentence is digitized into an individual input feature vector matrix 312.

At processing block 610, each input feature vector matrix 312 is decomposed into speaker-specific recognition units 322. The decomposition is as described in reference to FIG. 5. The decomposition results in a set of vectors $s_{j,k}$ (1≤j≤J, 1≤k≤K), one set of vectors for each training sentence of each speaker.

At processing block 620, speaker-specific recognition distribution values 316 are computed for each speaker. In one embodiment, a centroid for each speaker is determined using the following formula:

$$\bar{\mu}_j = \frac{1}{K} \sum_{k=1}^{K} S_{j,k},$$

In addition, the global covariance matrix is computed by the following formula:

$$G = \frac{1}{J} \frac{1}{K} \sum_{j=1}^{J} \sum_{k=1}^{K} (S_{j,k} - \mu_j)(S_{j,k} - \mu_j)^T$$

In one embodiment, the global variance matrix is used, as compared to speaker-specific covariances, as the estimation of the matrix becomes a problem in small sampling where K<R. (In general, in situations where the number of speakers and/or sentence is small, a pre-computed speaker-independent covariance matrix is used to increase reliability.)

Figure 7:
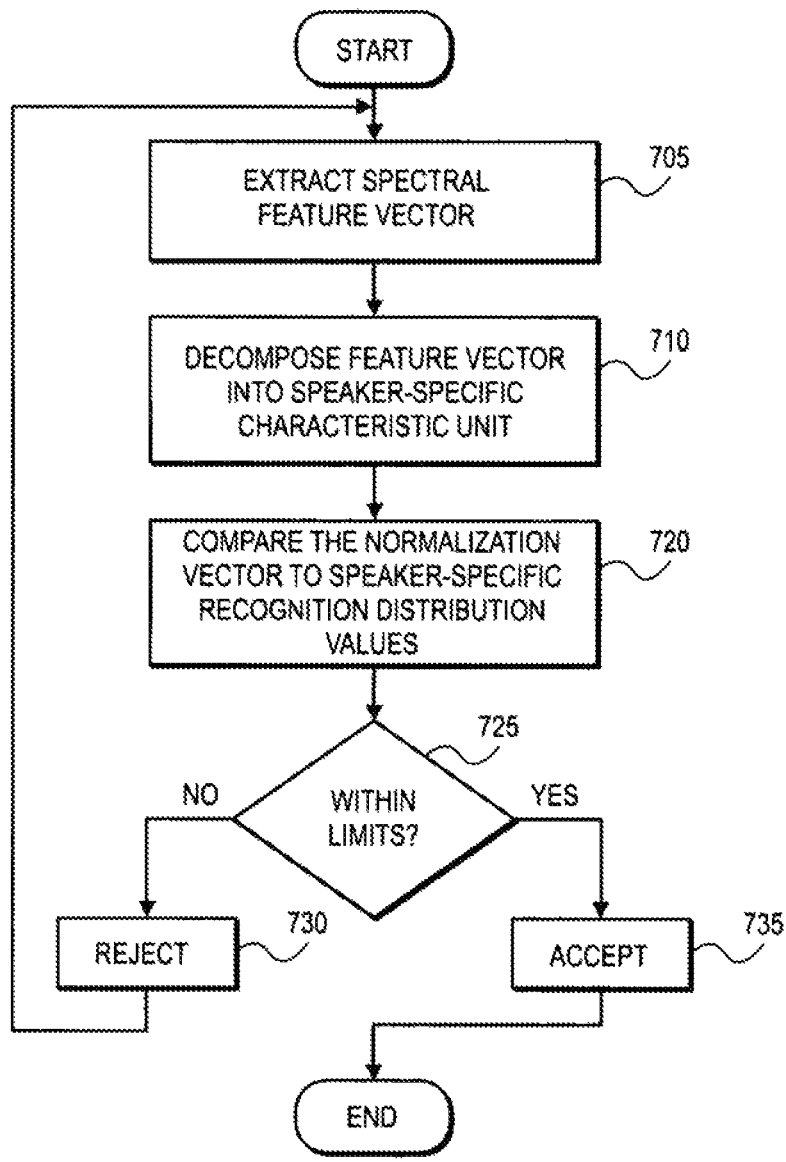
FIG. 7 is a flow diagram of one embodiment for user authentication by voice.

FIG. 7 is a flow diagram of one embodiment for user authentication by voice. Initially at processing block 705, a spectral feature vector is extracted for an input access sentence. The extraction process is similar to the extraction process of processing block 605 above.

At processing block 710, the input feature vector is decomposed into a speaker-specific characteristic unit 322. The SVD is applied to the input feature vector as described in reference to FIG. 5. The decomposition is as described above.

At processing block 720, the speaker-specific characteristic unit 322 is compared to the speaker-specific recognition distribution values 316 previously trained by the user. The speaker-specific characteristic unit 322 may be represented by $s_0$ which may be compared to the centroid associated with the speaker as identity is being claimed, $u_j$. For example, the distance between $s_0$ and $u_j$ may be computed as follows:

$$d(s_0, U_j) = (s_0 - U_j)^T G^{-1} (S_0\_U_j).$$

At processing block 725, the distance $d(s_0, U_j)$ is compared to a set threshold limit. If the distance $d(s_0, U_j)$ falls within the threshold, then at processing block 735, the user authentication is acceptable and the user is allowed to proceed. For example, if the user authentication is utilized to gain access to a personal computer, the user will be allowed to access the personal computer. If at processing block 725, the distance $d(s_0, U_j)$ is not within the threshold limit, then at processing block 730, the user authentication is rejected and, in one embodiment, the user is returned to the beginning, at processing block 705, for input and retry of the input sentence. In one embodiment, the user may be allowed to attempt to enter the user authentication by voice a given number of times before the process terminates.

In an alternate embodiment, the threshold limit is not used and the following method is used for the authentication. The distance, $d(s_0, U_j)$, is computed for all registered speakers within the system. If the distance for the speaker as claimed is the smallest distance computed, and there is no other distance within the same appropriate ratio (for example, 15%) of the minimum distance, the speaker is accepted. The speaker is rejected if either of the above conditions is not true.

In one embodiment, for verbal content verification, the singular values are not used, since they do not contain information about the utterance text itself. However, this information is present in the sequence of left singular vectors $u_m (1 \leq m \leq M)$. So, comparing two utterances for verbal content can be done by comparing two sequences of left singular vectors, each of which is a trajectory in a space of dimension R. It is well-known that dynamic time-warping is more robust in a low-dimensional space than in a high-dimensional space. As a result, it can be taken advantage of within the SVD approach to perform verbal content verification.

Using dynamic time-warping, the time axes of the input $u_n$ sequence and the reference $u_m$ sequence are aligned, and the degree of similarity between them, accumulated from the beginning to the end of the utterance, is calculated. The degree of similarity is best determined using Gaussian distances, in a manner analogous to that previously described. Two issues are worth pointing out, however. First, the $u_m$ sequences tend to be fairly "jittery", which requires some smoothing before computing meaningful distances. A good choice is to use robust locally weighted linear regression to smooth out the sequence. Second, the computational load, compared to speaker verification, is greater by a factor equal to the average number of frames in each utterance. After smoothing, however, some downsampling may be done to speed-up the process.

The above system was implemented and released as one component of the voice login feature of MacOS 9. When tuned to obtain an equal number of false acceptances and false rejections, it operates at an error rate of approximately 4%. This figure is comparable to what is reported in the literature for HMM-based systems, albeit obtained at a lower computational cost and without any language restrictions.

The specific arrangements and methods herein are merely illustrative of the principles of this invention. Numerous modifications in form and detail may be made by those skilled in the art without departing from the true spirit and scope of the invention.

What is claimed is:

1. A method of speech-based user authentication, comprising:
    at a device having one or more processors and memory:
        receiving a plurality of different spoken utterances from a user;
        for each of the plurality of different spoken utterances:
            generating a respective phoneme-independent representation from the spoken utterance, the respective phoneme-independent representation including a respective spectral signature for each of a plurality of frames sampled from the spoken utterance; and
            decomposing the respective phoneme-independent representation to obtain a respective content-independent recognition unit for the user;
        calculating a content-independent recognition distribution value for the user based on the respective content-independent recognition units generated from the plurality of different spoken utterances; and
        providing the content-independent recognition distribution value for use in a speaker authentication process.

2. The method of claim 1, wherein decomposing the respective phoneme-independent representation for each of the plurality of different spoken utterances further comprises:
    applying a singular value decomposition to the respective phoneme-independent representation.

3. The method of claim 1 further comprising:
    generating the respective content-independent recognition unit from a singular value matrix of a singular value decomposition of the respective phoneme-independent representation for each of the plurality of different spoken utterances.

4. The method of claim 1, wherein the speaker authentication process comprises:
    decomposing at least one spectral signature of an input speech signal into at least one content-independent characteristic unit;
    comparing the at least one content-independent characteristic unit to the at least one content-independent recognition distribution value; and
    authenticating the input speech signal if the at least one content-independent characteristic unit is within a threshold limit of the at least one content-independent recognition distribution value.

5. The method of claim 4, wherein decomposing the at least one spectral signature of the input speech signal into the at least one content-independent characteristic unit further comprises:
    applying a singular value decomposition to the at least one spectral signature of the input speech signal.

6. The method of claim 4, wherein:
    for each of the plurality of different spoken utterances, the respective phoneme-independent representation is decomposed to further obtain a respective content reference sequence;
    the at least one spectral signature of the input speech signal is further decomposed into at least one content input sequence; and
    authenticating the input speech signal further comprises authenticating the input speech signal if the at least one content input sequence is similar to at least one of the respective content reference sequences.

7. The method of claim 6, further comprising:
    determining similarity based on a distance calculated between the at least one content input sequence and the at least one of the respective content reference sequences.

8. A method of authenticating a speech signal comprising:
    at a device having one or more processors and memory:
        receiving a spoken utterance of an unauthenticated speaker;
        generating a first phoneme-independent representation based on the spoken utterance;

decomposing the first phoneme-independent representation into at least one content-independent characteristic unit;

comparing the at least one content-independent characteristic unit to at least one content-independent recognition distribution value, the at least one content-independent recognition distribution value previously trained by a registered speaker and generated by decomposing a second phoneme-independent representation that is associated with the registered speaker to obtain at least one content-independent recognition unit; and authenticating the spoken utterance if the at least one content-independent characteristic unit is within a threshold limit of the at least one content-independent recognition distribution value.

9. The method of claim 8, further comprising:
generating the content-independent characteristic unit from a singular value matrix of a singular value decomposition of the first phoneme-independent representation.

10. The method of claim 8, further comprising:
computing the at least one content-independent recognition distribution value from the at least one content-independent recognition unit.

11. The method of claim 10, further comprising:
generating the at least one content-independent recognition unit from a singular value matrix of a singular value decomposition of the second plurality of phoneme-independent representation.

12. The method of claim 10, wherein decomposing the first phoneme-independent representation further comprises:
applying a singular value decomposition to the first phoneme-independent representation.

13. The method of claim 8, wherein decomposing the first phoneme-independent representation further comprises:
applying a singular value decomposition to the first phoneme-independent representation.

14. The method of claim 8, wherein the first phoneme-independent representation is further decomposed into at least one content input sequence, and wherein authenticating the spoken utterance further comprises authenticating the spoken utterance if the at least one content input sequence is similar to at least one content reference sequence previously trained by the registered speaker.

15. The method of claim 14, further comprising:
determining similarity based on a distance calculated between the at least one content input sequence and the at least one content reference sequence.

16. A non-transitory computer-readable storage medium comprising instructions for causing one or more processor to:
receive a plurality of different spoken utterances from a user;
for each of the plurality of different spoken utterances:
generate a respective phoneme-independent representation from the spoken utterance, the respective phoneme-independent representation including a respective spectral signature for each of a plurality of frames sampled from the spoken utterance; and
decompose the respective phoneme-independent representation to obtain a respective content-independent recognition unit for the user;
calculate a content-independent recognition distribution value for the user based on the respective content-independent recognition units generated from the plurality of different spoken utterances; and
provide the content-independent recognition distribution value for use in a speaker authentication process.

17. A non-transitory computer-readable storage medium comprising instructions for causing one or more processor to:
receive a spoken utterance of an unauthenticated speaker;
generate a first phoneme-independent representation based on the spoken utterance;
decompose the first phoneme-independent representation into at least one content-independent characteristic unit;
compare the at least one content-independent characteristic unit to at least one content-independent recognition distribution value, the at least one content-independent recognition distribution value previously trained by a registered speaker and generated by decomposing a second phoneme-independent representation associated with the registered speaker to obtain at least one content-independent recognition unit; and
authenticate the spoken utterance if the at least one content-independent characteristic unit is within a threshold limit of the at least one content-independent recognition distribution value.

18. A system for speech-based user authentication, comprising:
one or more processors;
memory;
one or more programs, wherein the one or more programs are stored in the memory and configured to be executed by the one or more processors, the one or more programs including instructions for:
receiving a plurality of different spoken utterances from a user;
for each of the plurality of different spoken utterances:
generating a respective phoneme-independent representation from the spoken utterance, the respective phoneme-independent representation including a respective spectral signature for each of a plurality of frames sampled from the spoken utterance; and
decomposing the respective phoneme-independent representation to obtain a respective content-independent recognition unit for the user;
calculating a content-independent recognition distribution value for the user based on the respective content-independent recognition units generated from the plurality of different spoken utterances; and
providing the content-independent recognition distribution value for use in a speaker authentication process.

19. The system of claim 18, wherein the one or more programs further include instructions for:
decomposing at least one spectral signature of an input speech signal into at least one content-independent characteristic unit;
comparing the at least one content-independent characteristic unit to the at least one content-independent recognition distribution value; and
authenticating the input speech signal if the at least one content-independent characteristic unit is within a threshold limit of the at least one content-independent recognition distribution value.

20. The system of claim 18, wherein:
decomposing the respective phoneme-independent representation for each of the plurality of different spoken utterances further comprises decomposing the respective phoneme-independent representation to obtain a respective content reference sequence;
decomposing the at least one spectral signature of the input speech signal further comprises decomposing the at least one spectral signature of the input speech signal into at least one content input sequence; and authenticating the input speech signal further comprises authenticating the input speech signal if the at least one content input sequence is similar to at least one of the respective content reference sequences.

21. The system of claim 20, wherein the one or more programs include instructions for:

determining similarity based on a distance calculated between the at least one content input sequence and the at least one of the respective content reference sequences.

22. A system for authenticating a speech signal, comprising:

one or more processors;

memory;

one or more programs, wherein the one or more programs are stored in the memory and configured to be executed by the one or more processors, the one or more programs including instructions for:

receiving a spoken utterance of an unauthenticated speaker;

generating a first phoneme-independent representation based on the spoken utterance;

decomposing the first phoneme-independent representation into at least one content-independent characteristic unit;

comparing the at least one content-independent characteristic unit to at least one content-independent recognition distribution value, the at least one content-independent recognition distribution value previously trained by a registered speaker and generated by decomposing a second phoneme-independent representation associated with the registered speaker to obtain at least one content-independent recognition unit; and authenticating the spoken utterance if the at least one content-independent characteristic unit is within a threshold limit of the at least one content-independent recognition distribution value.

23. The system of claim 22, wherein decomposing the first phoneme-independent representation further comprises:

applying a singular value decomposition to the first phoneme-independent representation.

24. The system of claim 22, wherein decomposing the first phoneme-independent representation further comprises decomposing the first phoneme-independent representation into at least one content input sequence, and wherein authenticating the spoken utterance further comprises authenticating the spoken utterance if the at least one content input sequence is similar to at least one content reference sequence previously trained by the registered speaker.

25. The system of claim 24, wherein the one or more programs further include instructions for:

determining similarity based on a distance calculated between the at least one content input sequence and the at least one content reference sequence.

* * * * *